(12) United States Patent
Atoji et al.

(10) Patent No.: US 6,393,168 B1
(45) Date of Patent: May 21, 2002

(54) METHOD AND APPARATUS FOR MAINTAINING OPTICAL SIGNAL HAVING LOW DEGREE OF POLARIZATION IN SPECIFIC STATE OF POLARIZATION

(75) Inventors: Motoyuki Atoji, Kawasaki; Eiichi Sugai, Tokyo, both of (JP)

(73) Assignee: NTT Advanced Technology Corporation, Tokyo (JP)

( * ) Notice: Subject to any disclaimer, the term of this patent is extended or adjusted under 35 U.S.C. 154(b) by 0 days.

(21) Appl. No.: 09/281,871

(22) Filed: Mar. 31, 1999

(30) Foreign Application Priority Data

Mar. 31, 1998 (JP) ............................ 10-104178
Mar. 31, 1998 (JP) ............................ 10-104179

(51) Int. Cl.$^7$ ............................. G02B 6/27; G02B 6/26
(52) U.S. Cl. ............................. 385/11; 385/15; 385/24; 385/39
(58) Field of Search ............................. 385/11, 15, 24, 385/27, 31, 33, 35, 38, 39, 50, 123–127

(56) References Cited

U.S. PATENT DOCUMENTS

| 4,997,282 A | * | 3/1991 | Pavlath ........................ 356/460 |
| 5,311,603 A | * | 5/1994 | Fidric ............................ 385/11 |
| 5,420,949 A | * | 5/1995 | Arima et al. ............. 385/11 X |
| 5,692,082 A | * | 11/1997 | Fukushima ............... 385/33 X |
| 5,780,847 A | * | 7/1998 | Dawson et al. .......... 385/11 X |
| 6,049,415 A | * | 4/2000 | Grubb et al. ............. 385/11 X |

FOREIGN PATENT DOCUMENTS

| JP | 62-203107 | 3/1986 |
| JP | 62-203107 | 9/1987 |
| JP | 63-233583 | 9/1988 |
| JP | 3-239212 | * 10/1991 |
| JP | 4-265834 | 9/1992 |
| JP | 5-264215 | 10/1993 |
| JP | 7-140358 | 11/1993 |
| JP | 6-050842 | 2/1994 |
| JP | 6-066517 | 3/1994 |
| JP | 9-072723 | 3/1997 |
| JP | 9-119814 | 5/1997 |
| JP | 7-140358 | 6/1998 |

OTHER PUBLICATIONS

Low Coherence Reflectometry for Measuring Reflection from Optical Devices IEC SC86B/WG4/MITACHI–96–3 (p.7–20) (1996).

"Study of coherent return loss measurement using optical fiber delay line", Kobayashi et al, EMD92–10, CPM92–64, OQE92–73 (p. 97–102) (No Date).

Polarization Maintaining Fiber—Introduction to Optical Fiber Communications, Japanese Document 1989, Journal name not available, ISBN4–274–03266–3.

"Low Coherent Edge–Emitting LEDs", Kashima et al, Okidenki Kenkyu Kaihatsu Jan. 1997 Serial No. 173, vol. 64. No. 1, pp. 47–50.

* cited by examiner

Primary Examiner—John D. Lee
(74) Attorney, Agent, or Firm—Blakely Sokoloff Taylor & Zafman

(57) ABSTRACT

An optical circuit includes a light source having a low degree of polarization, an input section connected to the light source, and an output section connected to the input section. The input section has an optical waveguide incapable of maintaining a state of polarization. The output section has at least one optical waveguide having no branches. The optical waveguide having no branches has, in at least part thereof, an optical waveguide capable of maintaining a state of polarization.

10 Claims, 12 Drawing Sheets

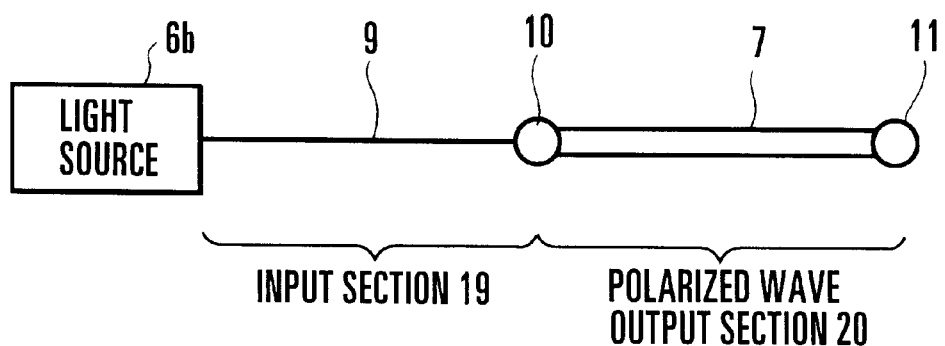
F I G. 1
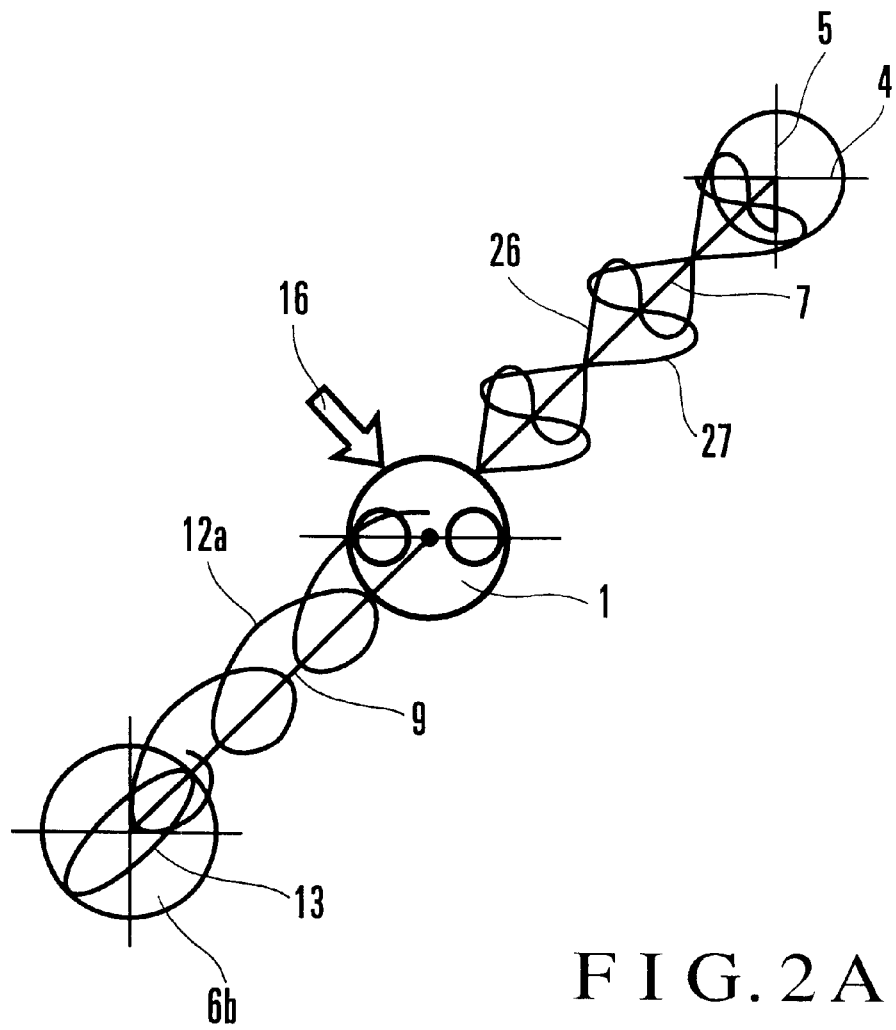
F I G. 2A

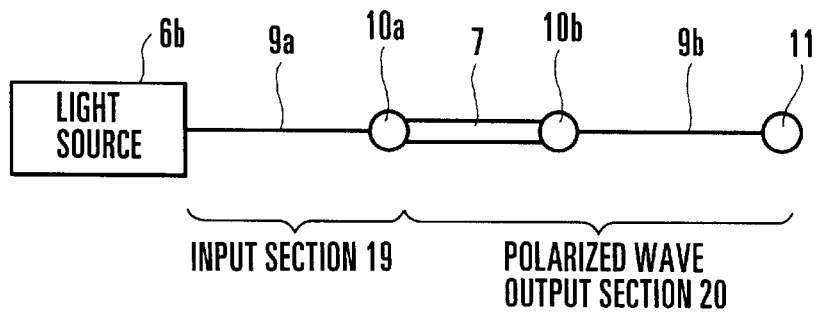
F I G. 3
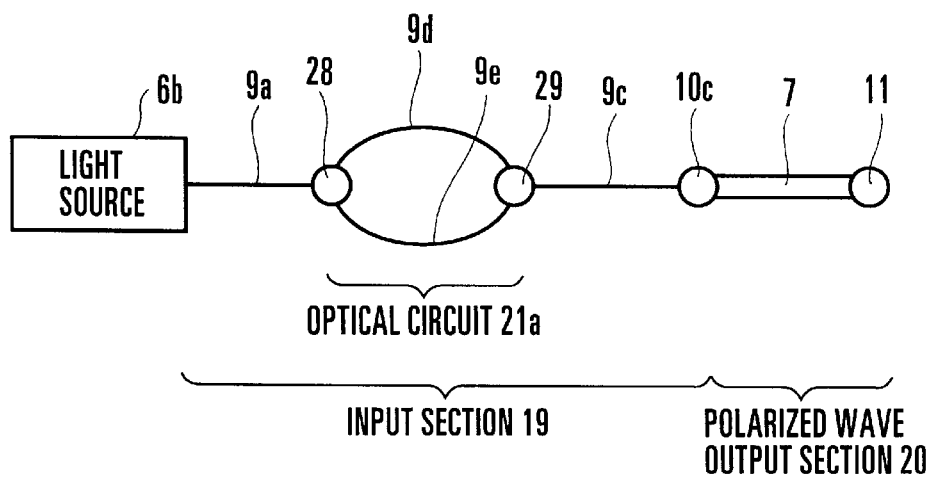
F I G. 4
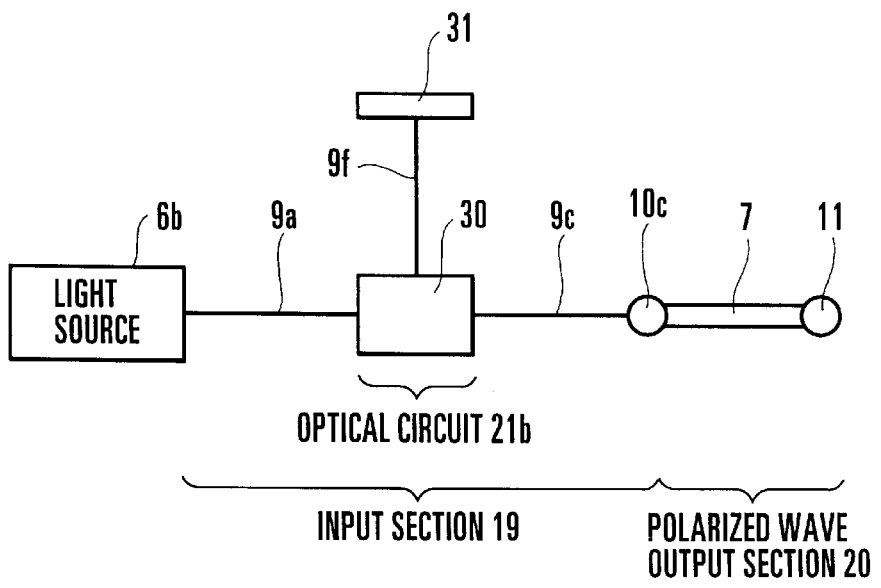
F I G. 5

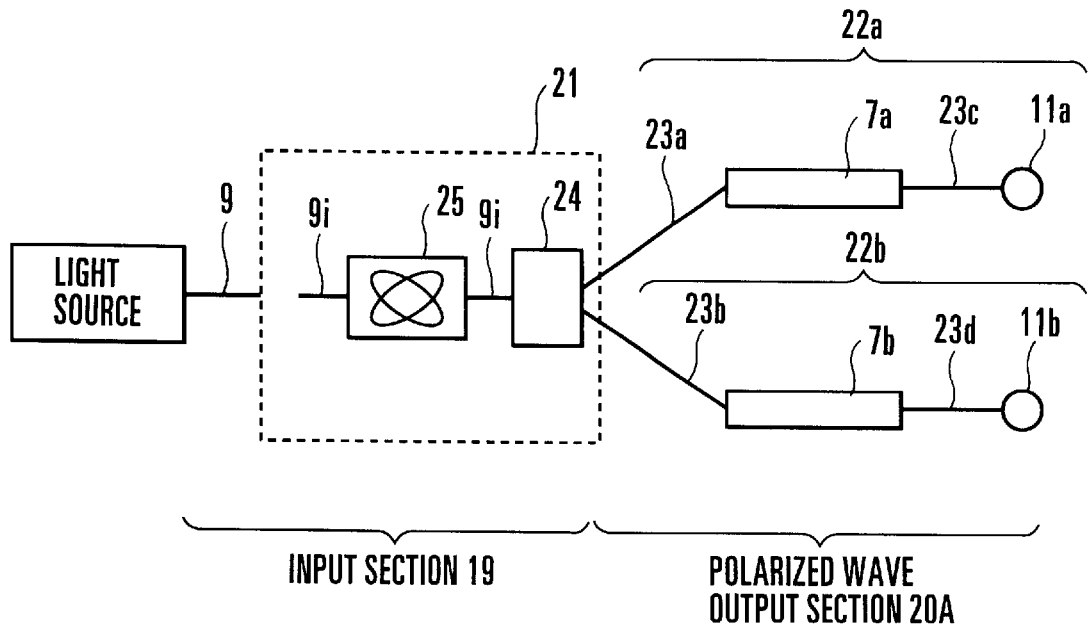
F I G. 11
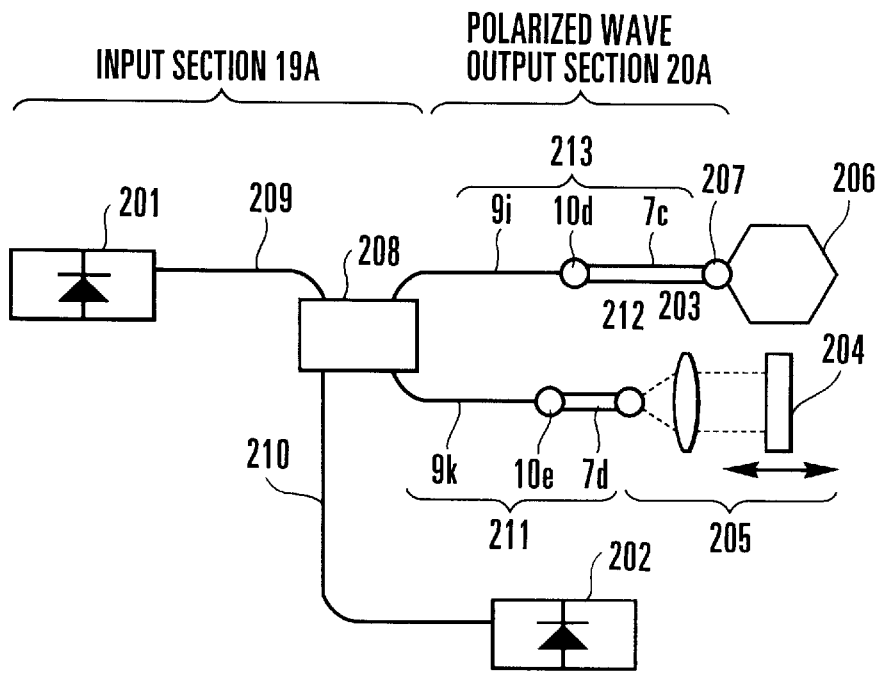
F I G. 12

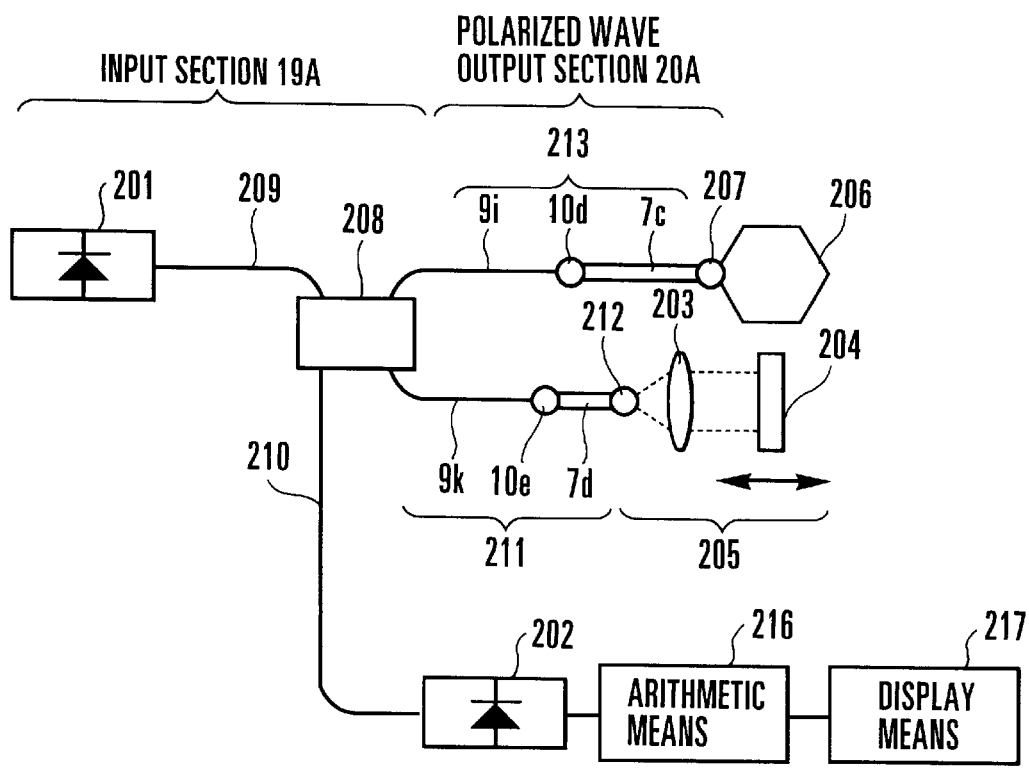
F I G. 13
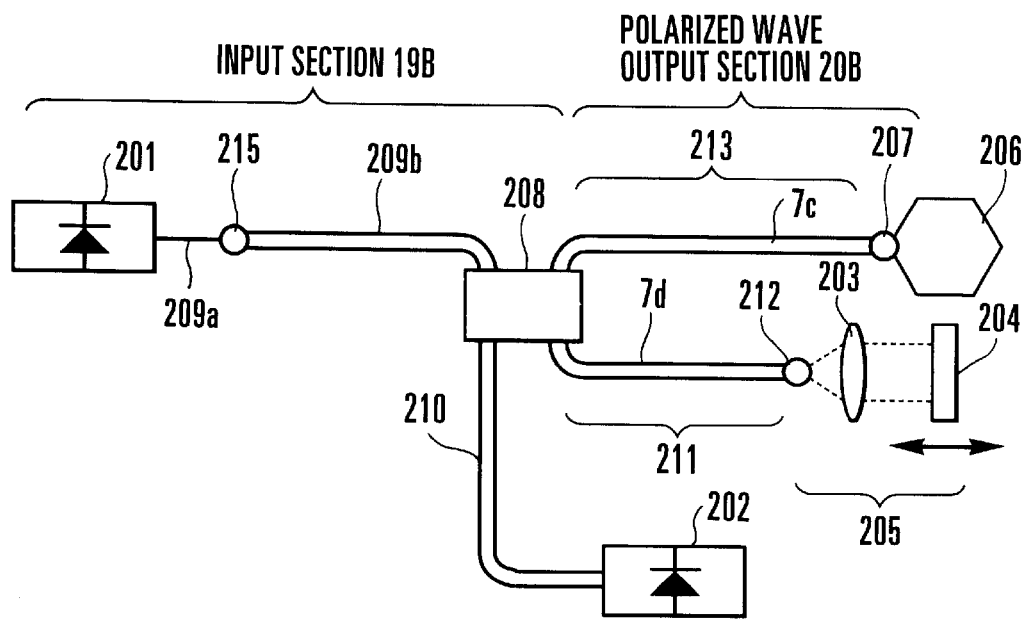
F I G. 14

METHOD AND APPARATUS FOR MAINTAINING OPTICAL SIGNAL HAVING LOW DEGREE OF POLARIZATION IN SPECIFIC STATE OF POLARIZATION

BACKGROUND OF THE INVENTION

The present invention relates to a method and apparatus for maintaining an incident optical signal having a low degree of polarization in a specific state of polarization at a terminal of an optical waveguide.

In the technical field of transmitting a light beam while maintaining its state of polarization, a special optical fiber capable of maintaining the state of polarization, i.e., a polarization maintaining optical fiber is often used. "Introduction to Optical Fiber Communications" (Yasuharu Suematsu et.al., OHM-sha, Ltd., pp. 197–199, Mar. 10, 1991, Third Edition) describes polarization maintaining optical fibers. An optical fiber having increased elliptical deformation and axially asymmetrical side pits in the gradient index to increase structural axial asymmetry, an elliptical jacket fiber having a double cladding structure and an elliptically deformed intermediate cladding to apply stress to the core, and the like are available in addition to the PANDA fiber (Polarization maintaining and absorption reducing fiber) having a structure in which stress applying portions are formed in the cladding to apply anisotropic stress to the core.

The most popular PANDA fiber has only two directions of the plane of polarization allowed to be maintained, as shown in FIG. 16. The directions of the plane of polarization of the remaining polarization maintaining optical fibers described above are also limited to specific directions.

As shown in FIG. 16, reference numeral 101 denotes a cross-section of the PANDA fiber. Stress applying portions 103a and 103b are present on the cross-section 101 so as to sandwich a core 102 through which a light beam passes. Directions 104 and 105 along which the polarization maintaining optical fiber can maintain the plane of polarization are a direction connecting the centers of the stress applying portions 103a and 103b, and a direction perpendicular to the above direction, as indicated by chain lines. No incident light beam having the plane of polarization in a direction except the above two directions can be maintained.

To solve this problem in a conventional arrangement, as shown in FIG. 17, a light source 106a having a high degree of polarization like a semiconductor laser is used. A polarization controller 108 serving as a means for arbitrarily changing the plane of polarization is arranged in front of a polarization maintaining optical fiber 107. The plane of polarization of a laser beam must be aligned in a polarization maintainable direction of the polarization maintaining optical fiber 107, and the aligned laser beam must be guided to the polarization maintaining optical fiber 107.

Referring to FIG. 17, reference numeral 109 denotes a single-mode optical fiber for connecting the light source 106a and the polarization maintaining optical fiber 107; and 110, a connecting portion between the polarization maintaining optical fiber 107 and the single-mode optical fiber 109. The connecting portion comprises an optical connector or may be fusion-spliced. Reference numeral 111 denotes an output terminal of the polarization maintaining optical fiber 107. The polarization controller 108 is located midway along the single-mode optical fiber 109 in FIG. 17. However, the polarization controller 108 may be arranged between the single-mode optical fiber 109 and the polarization maintaining optical fiber 107.

FIG. 18 shows the state of a propagation light beam in the optical circuit system shown in FIG. 17. Assume that a light beam emitted by the light source 106a having a high degree of polarization is an elliptically polarized light beam 112a (reference numeral 113 denotes its plane of polarization) (linear polarization and circular polarization correspond to special cases of elliptical polarization). In this case, the polarization controller 108 is inserted midway along the single-mode optical fiber 109 to convert the elliptically polarized light beam 112a into a linearly polarized light beam 114 parallel to a polarization maintaining plane 104 of the polarization maintaining optical fiber 107, and the linearly polarized light beam 114 is incident. The state of polarization in the polarization maintaining optical fiber 107 and the state of polarization of an exit light beam from the output terminal 111 can be kept constant.

FIG. 19 shows the state of a propagation light beam when the polarized light beam 112a emitted by the light source 106a having a high degree of polarization is incident on the polarization maintaining optical fiber 107 such that the plane 113 of polarization of the polarized light beam 112a is entirely different from the polarization maintaining direction of the optical fiber. That is, this is equivalent to the case in which the polarization controller 108 is omitted from the arrangement in FIG. 18. In this case, the polarization maintaining optical fiber 107 has no longer the polarization maintaining function. A polarized light beam 112b different from the polarized light beam 112a propagates through the polarization maintaining optical fiber 107 and emerges from the output terminal 111 in a state 115 of polarization different from the plane 113 of polarization. When the light beam receives perturbation 116 at any position in the polarization maintaining optical fiber 107, the state of polarization of the exit light beam changes from 115 to 117 in accordance with the perturbation 116. The perturbation is disturbance such as a dynamic stress, stress based on temperature or humidity, or the like.

Consider an optical system for allowing a polarization analyzer 118 to observe a light beam controlled by a polarization controller 108, as shown in FIG. 20. This system is obtained by adding the polarization analyzer 118 to the output terminal 111 in FIG. 17. The observation result is expressed on the Poincaré sphere using a state of polarization as the Stokes parameter, as shown in FIG. 21. Reference numeral 1101 denotes clockwise circular polarization; 1102, −45° linear polarization; 1103, vertical linear polarization; 1104, +45° linear polarization; 1105, horizontal linear polarization; and 1106, counterclockwise circular polarization. When the polarization controller 108 aligns the plane of polarization of the elliptically polarized light beam 112a with the plane of polarization of the polarization maintaining optical fiber 107, the plane of polarization observed by the polarization analyzer 118 is observed on an equator 1107 of the Poincaré sphere. That is, the observed light beam is any one of the linearly polarized light beams. When the plane of polarization of the elliptically polarized light beam 112a is not aligned with the plane of polarization of the polarization maintaining optical fiber 107, the state on the equator 1107 of the Poincaré sphere cannot be maintained upon receiving the perturbation in an unstable state of polarization. The state of polarization irregularly changes, as indicated by reference numeral 1108.

As described above, in light beam propagation using a light source having a high degree of polarization like a semiconductor laser while maintaining a state of polarization, the plane of polarization of an exit light beam from the semiconductor laser must be converted into the polarization maintaining direction of the polarization maintaining optical fiber using a means (e.g., a polarization controller) capable of arbitrarily changing the state of polarization. The converted light beam must be guided to the polarization maintaining optical fiber. The means for aligning the state of polarization with the polarization maintaining plane of the polarization maintaining optical fiber is generally expensive and complex. It is also possible to incorporate the polarization maintaining optical fiber as a semiconductor laser module while aligned with the plane of polarization of the exist light beam from the laser in advance. This semiconductor laser module is expensive. Much care must be taken for use of the semiconductor laser incorporating this semiconductor laser module in a measuring device requiring high precision.

An OTDR (Optical Time Domain Reflectometry) method has been used as an effective method of measuring the light beam return loss or the like of an optical waveguide or optical component. According to this method, an optical pulse is incident on a target measurement optical fiber, a Fresnel reflected light beam from the terminal or connecting portion of an optical fiber or a backscattering light beam from the interior of an optical fiber is received. The propagation loss in the optical fiber or the connection loss at the connecting point is measured from the reception intensity of the reflected light beam as a function of arrival time, i.e., the return loss distribution. In the general OTDR method, the spatial resolution and measurement sensitivity are limited to several 10 cm and about 60 dB, respectively, due to the influence of Rayleigh scattering.

To improve the measurement sensitivity and spatial resolution, an OLCR (Optical Low Coherence Reflectometry) method is proposed. This method is obtained by applying a Michelson optical interference circuit to the OTDR method.

Prior to a description of the OLCR method, a Michelson optical circuit made up of optical fibers will b e described below. The basic arrangement of the Michelson optical circuit is shown in FIG. 22. Referring to FIG. 22, reference numeral 1201 denotes a light source; 1202, an optical detector; 1205, an optical system including a collimator lens 1203 and a movable reflecting mirror 1204; 1207, a terminal connecting a test sample 1206; 1208, an optical multiplexer/demultiplexer; 1209, a first optical waveguide connecting the light source 1201 and the optical multiplexer/demultiplexer 1208; 1210, a second optical waveguide connecting the optical detector 1202 and the optical multiplexer/demultiplexer 1208; 1211, a third optical waveguide connecting the optical system 1205 and the optical multiplexer/demultiplexer 1208; 1212, an output terminal for a light beam from the third optical waveguide 1211 to the optical system 1205; and 1213, a fourth optical waveguide connecting the optical multiplexer/demultiplexer 1208 and the terminal 1207 connecting the test sample. The first optical waveguide 1209 comprises a first portion 1209a on the light source side and a second portion 1209b on the optical multiplexer/demultiplexer side. A polarization controller 1214 is inserted midway along the first portion 1209a. Reference numeral 1215 denotes a connecting portion between the first and second portions 1209a and 1209b of the first optical waveguide 1209.

The optical waveguides in this Michelson optical interference circuit comprise optical fibers and are required to suppress level variations in interference signal by variations in polarization of a propagation light beam. The state of polarization of a light beam propagating through the optical fiber must be maintained. For this purpose, polarization maintaining optical fibers are used as the optical waveguides. To guide a polarized light beam into the polarization maintaining optical fiber, a semiconductor laser having a high degree of polarization is generally used as a light source. The polarization controller is also used to align the plane of polarization of a light beam emitted by the light source with the polarization maintaining plane of the polarization maintaining optical fiber.

In FIG. 22, a semiconductor laser is used as the light source 1201. A single-mode optical fiber is used as the first portion 1209a of the first optical waveguide 1209. Polarization maintaining optical fibers are used as the second portion 1209b of the first optical waveguide 1209, the second optical waveguide 1210, the third optical waveguide 1211, and the fourth optical waveguide 1213, respectively. The polarization controller 1214 adjusts the plane of polarization of a light beam emitted by the light source 1201 to align with the polarization maintaining plane of the polarization maintaining optical fiber (second portion of the first optical waveguide) 1209b. If no adjustment is made, the state of polarization of a light beam propagating through the polarization maintaining optical fiber of the optical interference circuit becomes unstable, as described with reference to FIGS. 19 and 21.

A light beam emitted by the light source 1201 and having the adjusted plane of polarization passes through the first optical waveguide 1209 and is demultiplexed by the optical multiplexer/demultiplexer 1208 into two light beams. One light beam passes through the fourth optical waveguide 1213 and is guided to the test sample 1206. This light beam is reflected by the connecting terminal 1207 of the test sample 1206 or the interior of the test sample 1206. The reflected light beam returns to the optical multiplexer/demultiplexer 1208 through a reverse path. The other light beam passes through the third optical waveguide 1211, the connecting portion 1212, and the collimator lens 1203, and is reflected by the reflecting mirror 1204. The reflected light beam returns to the optical multiplexer/demultiplexer 1208 through a reverse path. The two reflected light beams returning to the optical multiplexer/demultiplexer 1208 cause interference when the optical path length from demultiplexing to reflection of one light beam is equal to that of the other light beam. The interference light beam is demultiplexed by the optical multiplexer/demultiplexer 1208 again, and the two light beams are guided to the optical detector 1202. An interference light intensity corresponding to the reflectances of the two light beams is sent to the optical detector 1202.

The reflecting mirror 1204 is movable. When the distance between the collimator lens 1203 and the reflecting mirror 1204 is changed, an interference signal between a light beam from the light source and a wave reflected by a defect or the like in the test sample 1206 at a position corresponding to the optical path light equal to that of the light beam from the light source can be detected by the optical detector 1202. The interference signals as a function of the positions of the reflecting mirror 1204, i.e., light beam return losses are plotted to obtain the distribution of defect positions in the optical fiber.

To cause stable interference in the Michelson interference optical system shown in FIG. 22, the state of polarization of a light beam must be constant at the input position (connecting terminal) 1207 to the test sample 1206 and the input position (output terminal) 1212 to the optical system 1205. That is, the optical waveguides 1211 and 1213 must have the function of maintaining the state of polarization.

The arrangement of a light beam return loss measuring device using the Michelson optical circuit shown in FIG. 22 is shown in FIG. 23. This arrangement is obtained by adding an arithmetic means 1216 and a display means 1217 to the Michelson optical circuit in FIG. 22. The arithmetic means 1216 calculates the return loss of the test sample on the basis of an output from the optical detector 1202. The display means 1217 displays the return loss of the test sample measured by the arithmetic means 1216.

The OLCR method is described in *Applied Optics* Vol. 26, No. 9, "New measurement system for fault location in optical waveguide devices based on an interferometric technique", Kazumasa Takada, et.al., November, 1989. The Michelson optical interference circuit is applied to the OTDR method to greatly improve the measurement sensitivity and spatial resolution.

The arrangement of the OLCR method in the above reference is shown in FIG. 24. This arrangement is based on the arrangement shown in FIG. 22. Only differences will be described. First, a single-mode optical fiber is not used as a first portion 1209 of a first optical waveguide 1209, and a light beam emitted by a light source 1201 passes in the air and is incident on a polarization controller 1214. The light beam then passes in the air and is incident on a second portion 1209b of the first optical waveguide. This difference s not essential. Second, a superluminescent diode (SLD) having a high degree of polarization but a low coherent radiation wave is used as the light source 1201. This diode has a wide emission spectral range having a center frequency of 1.3 µm and a half-width of 0.04 µm and allows high-output continuous oscillation. The wide range facilitates adjustment to a condition for causing interference using the frequency as the parameter. Third, a phase modulator 1218 is inserted midway along a fourth optical waveguide 1213 connecting a terminal 1207 connecting the test sample and an optical multiplexer/demultiplexer 1208. In the phase modulator 1218, an electrostrictive vibrator is used to modulate the with 6 kHz. The phase modulator 1218 performs periodic adjustment to a condition for causing interference using the optical path length as the parameter. Fourth, a fixed reflecting mirror 1219 is used in place of an optical system 1205 including a collimator lens and a movable reflecting mirror, and a second Michelson optical circuit 1220 is arranged between an optical detector 1202 and a second optical waveguide 1210 to adjust the optical path length.

As opposed to this second Michelson optical circuit 1220, the optical multiplexer/demultiplexer 1208, a second portion 1209b of the first optical waveguide 1209, the second optical waveguide 1210, a third optical waveguide 1211, the fourth optical waveguide 1213, the terminal 1207 connecting the test sample, and the fixed reflecting mirror 1219 constitute the first Michelson optical circuit. A light beam propagates in the optical fiber in the first Michelson optical circuit, while a light beam propagates in the air in the second Michelson optical circuit. A polarized light beam emerging from the second optical waveguide 1210 is demultiplexed into two light beams by a half mirror 1224 through a collimator lens 1222 and a polarizing beam splitter 1223. A fixing reflecting mirror 1225 reflects one light beam, while a movable reflecting mirror 1226 reflects the other light beam. The reflected light beams are coupled by the half mirror 1224. The resultant light beam passes through a collimator lens 1227 and is incident on the optical detector 1202. The movable reflecting mirror 1226 changes the optical path length to cause interference between a reference light beam reflected by the fixed reflecting mirror 1219 and the light beam reflected by the test sample 1206. Reference numeral 1228a denotes an input terminal of the second portion 1209b of the first optical waveguide 1209; and 1228b, an output terminal of the second optical waveguide 1210.

As described above, in the return loss measuring device using the Michelson interference circuits and the superluminescent diode (SLD) as the light source in accordance with the OLCR method using as the basic arrangement the interference circuit using the low coherent light source, a high measurement sensitivity of 60 dB or more can be obtained at a spatial resolution of 100 µm or less.

The SLD used in the above OLCR method is very expensive, and the polarization maintaining optical fibers used in the entire first Michelson optical circuit and the polarization controller for aligning the plane of polarization of a light beam emitted by the light source with the polarization maintaining plane of the polarization maintaining optical fiber are generally expensive.

Improvements have been made for low-cost return loss measuring devices. "Study of coherent return loss measurement using optical fiber delay line" (Technical Report of the Institute of Electronic, Information, and Communication Engineers of Japan: EMD92-40, Masaru Kobayashi et. al., August, 1992) describes a method of obtaining an OLCR arrangement using a Fabry-Pérot semiconductor laser.

The arrangement of this OLCR method is shown in FIG. 25. The arrangement in FIG. 25 is based on the arrangement shown in FIG. 22, and only differences will be described below. First, a Fabry-Pérot semiconductor laser is used as a light source 1201. Although this semiconductor laser has a high degree of polarization, a large number of longitudinal modes are excited at an interval of 1.11 nm in the 1.3-µm band to obtain an apparent spectral profile, thereby obtaining low coherency but a high degree of polarization. The OLCR arrangement is obtained using this. Second, a fixed reflecting mirror 1219 is used in place of an optical system 1205 including a lens 1203 and a movable mirror 1204, and an optical fiber delay line 1229 inserted midway along a third optical waveguide 1211 adjusts the optical path length. This optical fiber delay line 1229 stretches/contracts the reference optical fiber on a fine movement stage. Any one of the longitudinal modes is adjusted to satisfy the interference condition by this stretching/contraction.

In light beam propagation using the light source having a high degree of polarization like a semiconductor laser while maintaining the state of polarization, the plane of polarization of a light beam emitted by the semiconductor laser is converted into the polarization maintaining direction of the polarization maintaining optical fiber using a means for arbitrarily changing the state of polarization like a polarization controller. The converted light beam must be guided to the polarization maintaining optical fiber. The semiconductor laser is used in place of the SLD, and the arrangement cost is reduced accordingly. However, the number of polarization maintaining optical fibers is large, and the polarization controller is used. The return loss measuring device of the above method is still expensive.

The means for aligning the state of polarization with the polarization maintaining plane of the polarization maintaining optical fiber is generally expensive and complex. It is also possible to incorporate the polarization maintaining optical fiber as a semiconductor laser module while aligned with the plane of polarization of the exist light beam from the laser in advance. This semiconductor laser module is expensive. Much care must be taken for use of the semiconductor laser incorporating this semiconductor laser module in a measuring device requiring high precision. In particular, in the return loss measuring device for measuring a reflected light beam of 60 dB or more using interference in the Michelson optical system, high-precision adjustment is required to align the plane of polarization of a light beam with the polarization maintaining plane.

SUMMARY OF THE INVENTION

It is, therefore, the principal object of the present invention to provide a method and apparatus for maintaining an incident optical signal having a low degree of polarization in a specific state of polarization at an output terminal of an optical waveguide without positively using a special state-of-polarization control means.

It is another object of the present invention to provide a more inexpensive, compact, easy-to-handle light beam return loss measuring device than a conventional one.

In order to achieve the above objects of the present invention, there is provided a method of maintaining an incident optical signal having a low degree of polarization in a specific state of polarization at an output terminal of an optical waveguide, comprising the steps of inputting the optical signal having a low degree of polarization to an input section having as an input terminal an optical waveguide incapable of maintaining a state of polarization, and outputting an optical signal having the specific state of polarization to an output terminal of an output section through the output section having, in at least part thereof, an optical waveguide capable of maintaining a state of polarization and having no branches.

A conventional system having a light source having a high degree of polarization and an optical waveguide system capable of maintaining the state of polarization must be axially aligned with high precision. A state-of-polarization control means is inserted and adjusted to align the optical axis after polarization with the optical axis of the optical waveguide. An axial error caused by perturbation makes the state of polarization unstable to draw an irregular, unstable locus on the Poincaré sphere. Stability cannot be obtained unless the state-of-polarization control means is adjusted again to perform axial alignment. The state-of-polarization control means can align the plane of polarization, but cannot realize an arbitrary state of polarization.

A system having a light source having a low degree of polarization, an optical waveguide incapable of maintaining a state of polarization, and an optical waveguide capable of maintaining a state of polarization basically requires no state-of-polarization control means. The interaction between the light source having a low degree of polarization and the optical waveguide capable of maintaining the state of polarization allows stabilizing the state of polarization at the output terminal of the optical waveguide capable of maintaining the state of polarization.

Inserting the state-of-polarization control means allows controlling the state of polarization on the longitude of the Poincaré sphere. A change in position on the longitude and the stop at this position can stably maintain the corresponding state of polarization. Operation of controlling the state of polarization and stably maintaining it is conventionally permitted on only the equator (linear polarization), but is allowed in other regions for the first time according to the present invention. The degree of freedom of realizing various states of polarization increases, and a variety of possibilities for advancement can be brought about in research and development.

BRIEF DESCRIPTION OF THE DRAWINGS

FIG. 1 is a block diagram showing an optical circuit for explaining a method and apparatus for maintaining an incident optical signal having a low degree of polarization in a specific state of polarization at an output terminal of an optical waveguide according to an embodiment (first embodiment) of the present invention;

FIGS. 2A to 2C are views for explaining the state of a propagation light beam in the optical circuit system of FIG. 1, the Poincaré sphere, and the loop of a single-mode optical fiber;

FIG. 3 is a block diagram showing another embodiment (second embodiment) of the present invention;

FIG. 4 is a block diagram showing still another embodiment (third embodiment) of the present invention;

FIG. 5 is a block diagram showing still another embodiment (fourth embodiment) of the present invention;

FIG. 11 is a block diagram showing still another embodiment (10th embodiment) of the present invention;

FIG. 12 is a block diagram showing still another embodiment (11th embodiment) of the present invention;

FIG. 13 is a block diagram showing still another embodiment (12th embodiment) of the present invention;

FIG. 14 is a block diagram showing still another embodiment (13th embodiment) of the present invention;

DESCRIPTION OF THE PREFERRED EMBODIMENTS

First Embodiment

Figure 2B:
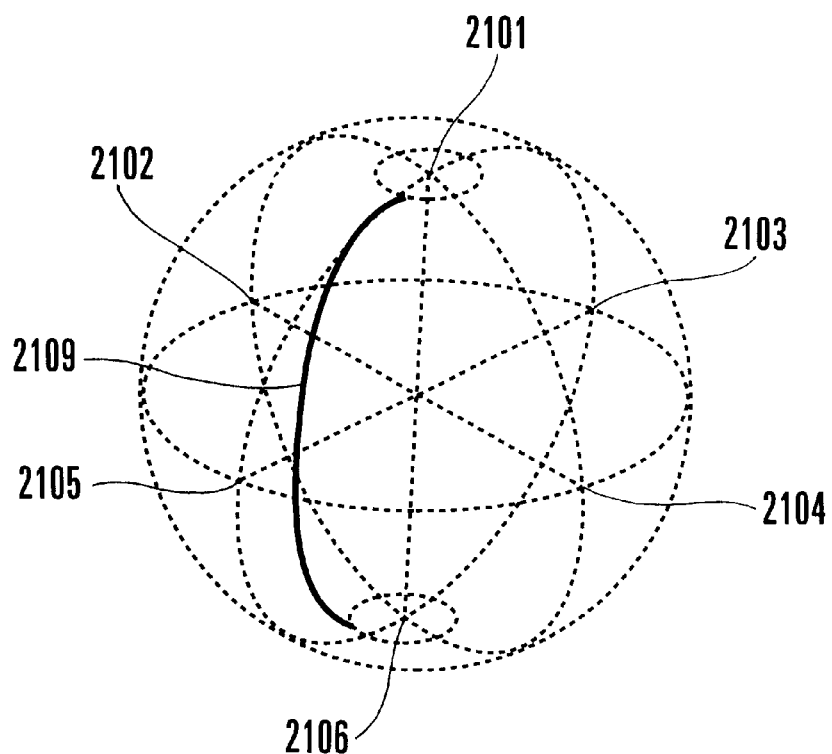

FIG. 1 shows an embodiment of the present invention. A light source 6b having a low degree of polarization is connected to an optical waveguide 9 incapable of maintaining a state of polarization (to be referred to as a DLWG 9 hereinafter). An optical waveguide 7 capable of maintaining a state of polarization (to be referred to as an ELWG 7 hereinafter) is connected to the DLWG 9. Reference numeral 11 denotes an output terminal of the ELWG 7; and 10, a connecting portion between the DLWG 9 and ELWG 7. An optical connector or fusion splicing is used for this connecting portion. An input section 19 includes the DLWG 9 and the connecting portion 10. A polarized wave output section (to be referred to as an output section, hereinafter) 20 includes the ELWG 7 and the output terminal 11.

The light beam propagation state in this optical system is shown in FIG. 2A. The light source 6b having a low degree of polarization emits an elliptically polarized light beam 13 having an arbitrary direction. When the light beam is incident on the ELWG 7, the polarized light beams 26 and 27 in polarization maintainable directions 4 and 5 are maintained in the ELWG 7. The states of the polarized light beams 26 and 27 are always maintained even upon reception of perturbation 16 at any position in the ELWG 7. Use of the light source 6b having a low degree of polarization can maintain a specific state of polarization on the Poincaré sphere, as shown in FIG. 2B, i.e., can keep the state of polarization on only one point on a longitude 2109 connecting clockwise circular polarization 2101 and counterclockwise circular polarization 2106. The state of polarization is kept unchanged even upon reception of the perturbation in the ELWG 7. Reference numeral 2101 denotes clockwise circular polarization; 2102, −45° linear polarization; 2103, vertical linear polarization; 2104, +45° linear polarization; 2105, horizontal linear polarization; and 2106, the counterclockwise circular polarization.

More specifically, the present inventor found the following. When the light source having a low degree of polarization is combined with the optical waveguide capable of maintaining the state of polarization, the state of polarization of the light beam propagating through this optical waveguide can be maintained even if the plane of polarization of the light beam emitted by the light source is not aligned with the plane of polarization of the optical waveguide capable of maintaining the state of polarization.

The degree of polarization is the ratio (%) of the polarized component energy to the total energy. The present invention uses the light source having a low degree of polarization. A light-emitting diode is known as the light source 6b having a low degree of polarization. As described in "Low Coherent Edge-Emitting LEDs" (Yasumasa Kashima, Okidenki Kenkyu Kaihatsu Serial No. 173, Vol. 64, No. 1, January, 1997), he light-emitting diode has a current vs. optical output characteristic excellent in linearity, small dependence of emission characteristics on temperature, and low coherence, can be operated with a simple drive circuit, and has a high reliability. The light-emitting diodes are applied to intermediate-distance optical communication systems, optical local area networks, and data communications.

As described in this reference, the light-emitting diodes are structurally classified into a surface-emitting diode and an edge-emitting diode. A light beam is emitted from the chip surface of the surface-emitting diode. The edge-emitting diode emits a light beam from the end face of the element in a direction parallel to a light-emitting layer as in a semiconductor laser. The features of the edge-emitting diode are a small beam spot and a narrow beam emission range. The edge-emitting diode is an expecting diode coupled to a single-mode optical fiber with high efficiency. The surface-emitting diode cannot converge a light beam because of a large emission area in the light beam propagation direction. To the contrary, since a light beam is emitted from a narrow area at the end face in the edge-emitting diode, a beam can generally converge in a small area.

In this embodiment, the edge-emitting diode was used as the light source 6b having a low degree of polarization, a PANDA fiber was used as the ELWG 7, and a single-mode optical fiber was used as the DLWG 9. It was confirmed that the state of polarization was sufficiently maintained at a degree of polarization of 30% or less. It was also confirmed that the state of polarization at the output terminal could be easily maintained regardless of an incident light beam having a lower degree of polarization, and the state of polarization was stable at a degree of polarization of 10% or less.

Second Embodiment

FIG. 3 shows another embodiment of the present invention. A DLWG 9a is connected to a light source 6b having a low degree of polarization. An ELWG 7 is connected to the DLWG 9a, and a DLWG 9b is connected to the ELWG 7. Reference numeral 11 denotes an output terminal of the DLWG 9b; and 10a and 10b, connecting portions between the DLWGs 9a and 9b and the ELWG 7 and are comprised of optical connectors or made by fusion splicing. No branch is output from the connecting portion 10b. An input section 19 includes the DLWG 9a and the connecting portion 10a, while an output section 20 includes the ELWG 7, the connecting portion 10b, the DLWG 9b, and the output terminal 11.

In this embodiment as well, an edge-emitting diode is used as the light source 6b, a PANDA fiber is used as the ELWG 7, and single-mode optical fibers are used as the DLWGs 9a and 9b, respectively. As in the first embodiment, the state of polarization can be sufficiently maintained at the output terminal 11 of the optical circuit.

Third Embodiment

FIG. 4 shows an arrangement according to still another embodiment of the present invention. A DLWG 9a is connected to a light source 6b having a low degree of polarization, an optical circuit 21a is connected to the DLWG 9a. A DLWG 9c is connected to the optical circuit 21a, and an ELWG 7 is connected to the DLWG 9c. Reference numeral 11 denotes an output terminal of the ELWG 7; and 10c, a connecting portion between the DLWG 9c and the ELWG 7. The connecting portion 10c is comprised of an optical connector or made by fusion splicing. The optical waveguide portion of the optical circuit 21a is comprised of DLWGs 9d and 9e which are connected to the DLWGs 9a and 9c through an optical demultiplexer 28 and an optical multiplexer 29 in the optical circuit 21a. An input section 19 includes the DLWGs 9a and 9c, the optical circuit 21a, and the connecting portion 10c, while an output section 20 includes the ELWG 7 and the output terminal 11.

In this embodiment as well, an edge-emitting diode is used as the light source 6b, a PANDA fiber is used as the ELWG 7, and single-mode optical fibers are used as the DLWGs 9a, 9c, 9d, and 9e respectively. As in the first embodiment, the state of polarization can be sufficiently maintained at the output terminal 11 of the optical circuit.

Fourth Embodiment

FIG. 5 shows still another embodiment of the present invention. A DLWG 9a is connected to a light source 6b having a low degree of polarization, and an optical circuit 21b is connected to the DLWG 9a. A DLWG 9c is connected to the optical circuit 21b, and an ELWG 7 is connected to the DLWG 9c. Reference numeral 11 denotes an output terminal of the ELWG 7; and 10c, a connecting portion between the DLWG 9c and the ELWG 7 and is comprised of an optical connector or made by fusion splicing. The optical circuit 21b comprises a DLWG 9f. One end of the DLWG 9f is connected to the DLWGs 9a and 9c via an optical multiplexer/demultiplexer 30. The other end of the DLWG 9f is connected to a reflecting mirror 31. An input section 19 includes the DLWGs 9a and 9c, the optical circuit 21b, and the connecting portion 10c. An output section 20 includes the ELWG 7 and its output terminal 11.

In this embodiment as well, an edge-emitting diode is used as the light source 6b, a PANDA fiber is used as the ELWG 7, and single-mode optical fibers are used as the DLWGs 9a, 9c, and 9f respectively. As in the first embodiment, the state of polarization can be sufficiently maintained at the output terminal 11 of the optical circuit.

The relatively simple optical circuits have been described in the first to fourth embodiments. Any optical circuit can be used unless an optical component such as an analyzer for controlling the state of polarization is included in place of the optical circuits 21a and 21b of the third and fourth embodiments. In each of the first to fourth embodiments, the PANDA fiber is used as an optical waveguide capable of maintaining the state of polarization. However, an optical fiber having increased elliptical deformation and axially asymmetrical side pits in the gradient index to increase structural axial asymmetry, an elliptical jacket fiber having a double cladding structure and an elliptically deformed intermediate cladding to apply stress to the core, and the like can be used in place of the PANDA fiber. In addition, a waveguide in an optical integrated circuit may be used in place of an optical fiber waveguide. Any change and modification can be made without departing the spirit and scope of the invention. These other optical waveguides capable of maintaining the sate of polarization are known well, and a detailed description thereof will be omitted.

Fifth Embodiment

Figure 6:
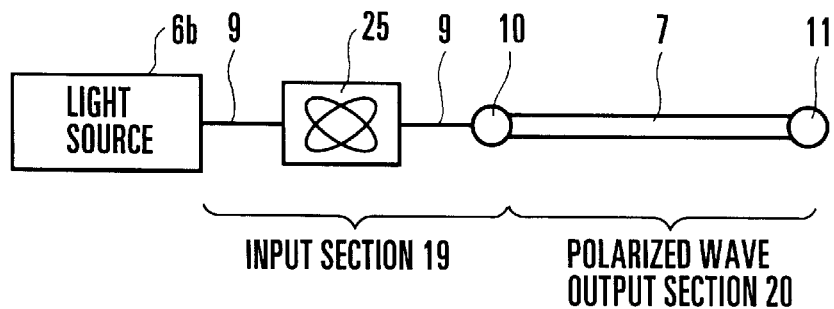
FIG. 6 is a block diagram showing still another embodiment (fifth embodiment) of the present invention.

FIG. 6 shows an optical circuit which allows polarization control by a combination of a light source having a low degree of polarization, an optical waveguide capable of maintaining a state of polarization, and a state-of-polarization control means. The arrangement of this embodiment is achieved by inserting a state-of-polarization control means 25 midway along a DLWG 9 or at its intermediate position. An input section 19 includes the DLWG 9, the state-of-polarization control means 25, and a connecting portion 10. An output section 20 includes the ELWG 7 and its output terminal 11. The state-of-polarization control means 25 is inserted on the input section 19 side with respect to the ELWG 7.

If the optical waveguide 7 is incapable of maintaining the state of polarization, a specific state of polarization cannot be achieved without complex control. However, when the optical waveguide 7 is capable of maintaining a state of polarization, and the state of an elliptically polarized light beam incident on the optical waveguide 7 changes in all directions, it is found that a light beam held in the optical waveguide 7 traces uniquely on a longitude 2109 of the Poincaré sphere shown in FIG. 2B under the control of the state-of-polarization control means 25. According to this embodiment, since the optical waveguide 7 is comprised of an optical waveguide capable of maintaining the state of polarization, use of the state-of-polarization control means 25 facilitates control of the state of polarization in a predetermined region on the longitude 2109 of the Poincaré sphere.

Figure 2C:
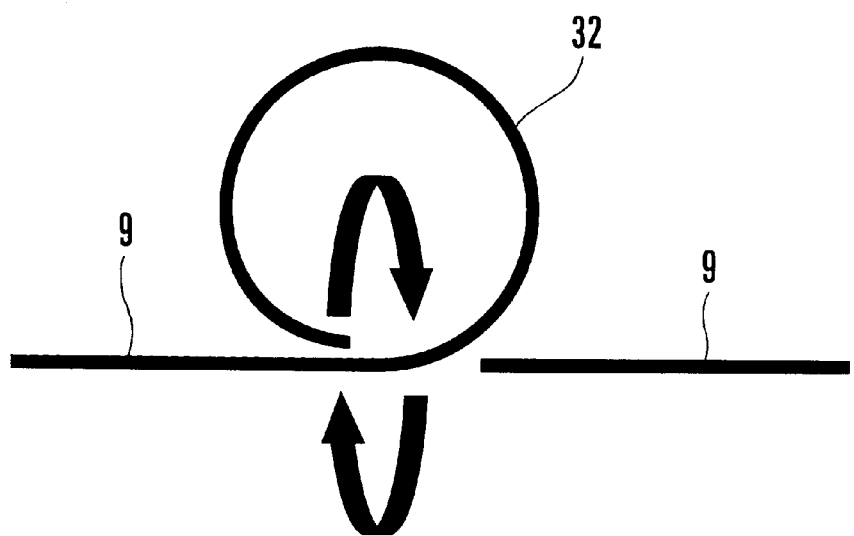

The state of polarization changes when a normal optical fiber receives stress due to birefringence or the like, as is known well. By using this phenomenon, the state-of-polarization control means 25 can be easily arranged. For example, as shown in FIG. 2C, a loop 32 is formed using a single-mode optical fiber 9 and is rotated indicated by an arrow, thereby changing the state of polarization of a light beam passing through the loop 32. This state-of-polarization control means is called a fiber-type polarization controller. Alternatively, one $\lambda/4$ plate and one $\lambda/2$ plate may be arranged serially and rotated to obtain all states of polarization. These wavelength plates may be combined to constitute the state-of-polarization control means.

In this embodiment, an edge-emitting diode is used as a light source 6b, a PANDA fiber is used as the ELWG 7, and a single-mode optical fiber is used as the DLWG 9. It was confirmed that the state of polarization could be sufficiently controlled at the output terminal 11 of the optical circuit at a degree of polarization of 30% or less.

Sixth Embodiment

Figure 7:
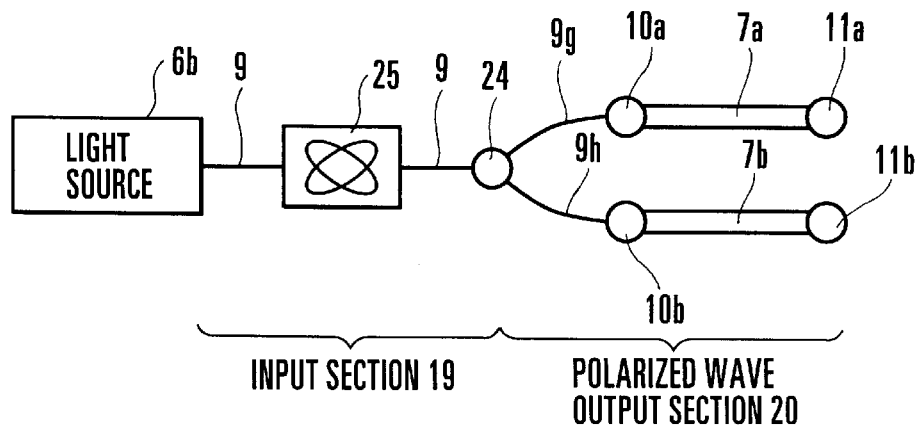
FIG. 7 is a block diagram showing still another embodiment (sixth embodiment) of the present invention.

FIG. 7 shows another embodiment of an optical circuit which allows polarization control by a combination of a light source having a low degree of polarization, an optical waveguide capable of maintaining a state of polarization, and a state-of-polarization control means. A DLWG 9 is connected to a light source 6b having a low degree of polarization, and the DLWG 9 is branched into DLWGs 9g and 9h via an optical demultiplexer 24. ELWGs 7a and 7b are connected to the DLWGs 9g and 9h via connecting portions 10a and 10b. A state-of-polarization control means 25 is inserted midway along the DLWG 9. Reference numerals 11a and 11b denote output terminals of the ELWGs 7a and 7b, respectively.

An input section 19 includes the DLWG 9, the state-of-polarization control means 25, and the optical demultiplexer 24. An output section 20 includes the DLWGs 9g and 9h, the connecting portions 10a and 10b, the ELWGs 7a and 7b, and the output terminals 11a and 11b. This arrangement may be alternatively understood as follows. The input section 19 may include the DLWG 9, the state-of-polarization control means 25, the optical demultiplexer 24, DLWGs 9g and 9h, and the connecting portions 10a and 10b, and the output section 20 may include the ELWGs 7a and 7b and the output terminals 11a and 11b. The state-of-polarization control means 25 is inserted on the input section 19 side with respect to the ELWGs 7a and 7b.

In this embodiment as well, an edge-emitting diode is used as the light source 6b, a PANDA fiber is used as the ELWG 7, and single-mode optical fibers are used as the DLWGs 9, 9g, and 9h respectively. The state of polarization can be sufficiently controlled at the output terminals 11a and 11b of the optical circuit.

Seventh Embodiment

Figure 8:
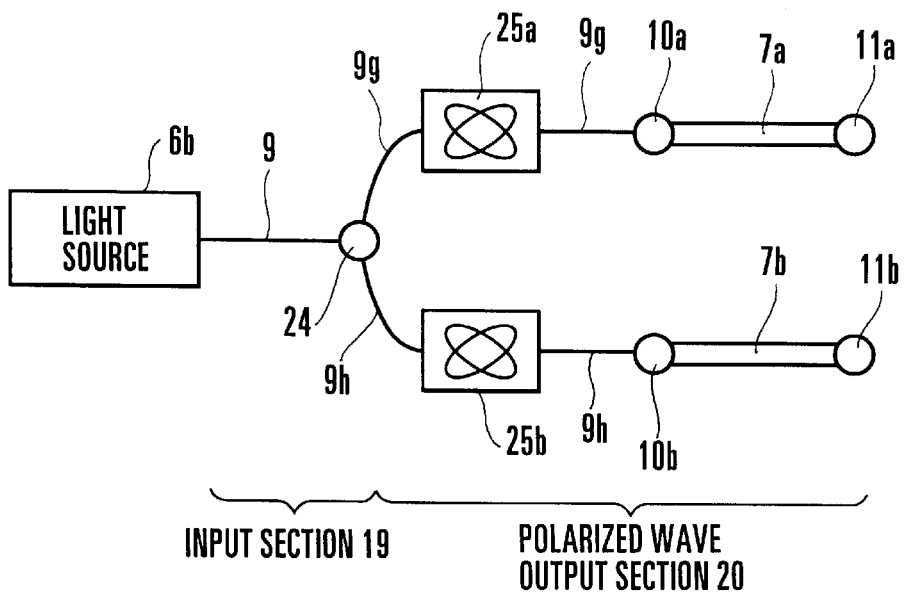
FIG. 8 is a block diagram showing still another embodiment (seventh embodiment) of the present invention.

FIG. 8 shows still another embodiment of an optical circuit which allows polarization control by a combination of a light source having a low degree of polarization, an optical waveguide capable of maintaining a state of polarization, and a state-of-polarization control means. In this embodiment, two state-of-polarization control means 25a and 25b are inserted midway along DLWGs 9g and 9h, respectively, in place of inserting the state-of-polarization control means 25 midway along the DLWG 9 in the arrangement in FIG. 7.

An input section 19 includes the DLWG 9 and an optical demultiplexer 24. An output section 20 includes the DLWGs 9g and 9h, the state-of-polarization control means 25a and 25b, connecting portions 10a and 10b, ELWGs 7a and 7b, and output terminals 11a and 11b. This arrangement may alternatively be understood as follows. The input section 19 may include the DLWG 9, the optical demultiplexer 24, the DLWGs 9g and 9h, the state-of-polarization control means 25a and 25b, and the connecting portions 10a and 10b, and the output section 20 may include the ELWGs 7a and 7b and the output terminals 11a and 11b. The state-of-polarization control means 25a and 25b are inserted on the input section 19 side with respect to the ELWGs 7a and 7b.

In this embodiment as well, an edge-emitting diode is used as the light source 6b, a PANDA fiber is used as the ELWG 7, and single-mode optical fibers are used as the DLWGs 9, 9g, and 9h respectively. The state of polarization can be sufficiently controlled at the output terminals 11a and 11b of the optical circuit.

The relative simple optical circuits have been described in the fifth to seventh embodiments. The present invention is also applicable to other optical circuits without departing the spirit and scope of the invention.

Eighth Embodiment

Figure 9:
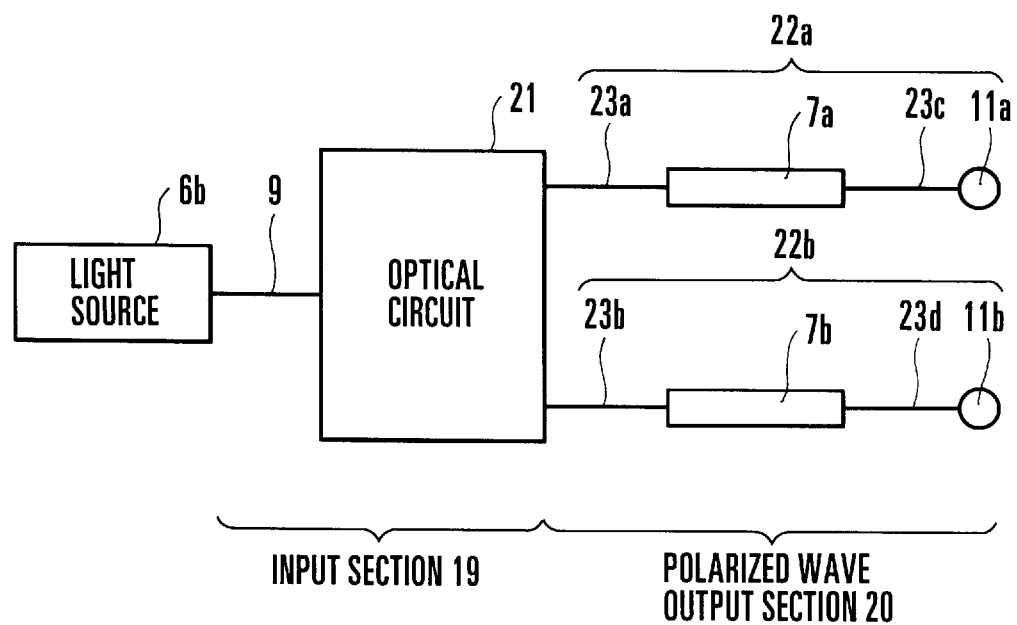
FIG. 9 is a block diagram showing still another embodiment (eighth embodiment) of the present invention.

FIG. 9 shows still another arrangement of an optical circuit of the present invention. An input section 19 of the optical circuit is connected to a light source 6b having a low degree of polarization, and an output section 20 is connected to the input section 19.

The input section 19 is comprised of a DLWG 9 and an arbitrary optical circuit 21. The arbitrary optical circuit 21 has an optical waveguide incapable of maintaining a state of polarization and an optical component incapable of controlling a state of polarization. More specifically, the input section 19 includes no optical waveguide or optical component which positively control the state of polarization of an incident light beam from the light source 6b. The output section 20 is comprised of optical waveguides 22a and 22b having no plurality of branches. The optical waveguide 22a is connected to a DLWG 23a, an ELWG 7a, and DLWG 23c in this order with respect to the input section 19. The DLWG 23c has an output terminal 11a. The optical waveguide 22b is connected to a DLWG 23b, an ELWG 7b, and a DLWG 23d in this order with respect to the input section 19. The DLWG 23d has an output terminal 11b. Connecting portions between the ELWG 7a and the DLWG 23a, between the ELWG 7a and the DLWG 23c, between the ELWG 7b and the DLWG 23b, and between the ELWG 7b and the DLWG 23d are not illustrated (the same applies to FIGS. 10 and 11). In the optical waveguides 22a and 22b of the output section 20, the polarization maintaining function is effected by the combination of the light source 6b having a low degree of polarization and the ELWGs 7a and 7b. Unless external perturbation acts on the DLWGs 23c and 23d, light beams having predetermined planes of polarization are output from the output terminals 11a and 11b.

Optical connectors are normally used to connect the optical waveguides, but they may be connected by fusion splicing. Optical connectors, optical multiplexers/demultiplexers, optical demultiplexers, optical multiplexers, optical switches, and the like are used to connect the optical waveguides and the optical circuit. However, they may be connected by fusion splicing. These optical components are included in the optical circuit 21 in connecting the optical waveguides on the output side and the optical circuit 21 in the arrangement of FIG. 9 (This also applies to the arrangements in FIGS. 10 and 11).

A variety of modifications can be proposed for the arrangement of the eighth embodiment. The input section 19 may be comprised of only one DLWG 9 and an optical demultiplexer. The optical waveguides 22a and 22b having no branches in the output section 20 may be constituted by one optical waveguide or three or more optical waveguides. If the optical waveguide 22a or 22b has at least the ELWG 7a or 7b, one or both of the DLWGs 23a and 23c or DLWG 23b and 23d can be omitted. In this case, there is no optical waveguide or optical component which positively controls the state of polarization of an incident light beam from the light source 6b. The polarization maintaining function by a combination of the light source 6b having a low degree of polarization and the ELWG 7a or 7b is effected to output a light beam having a predetermined plane of polarization from the output terminal 11a or 11b.

Ninth Embodiment

Figure 10:
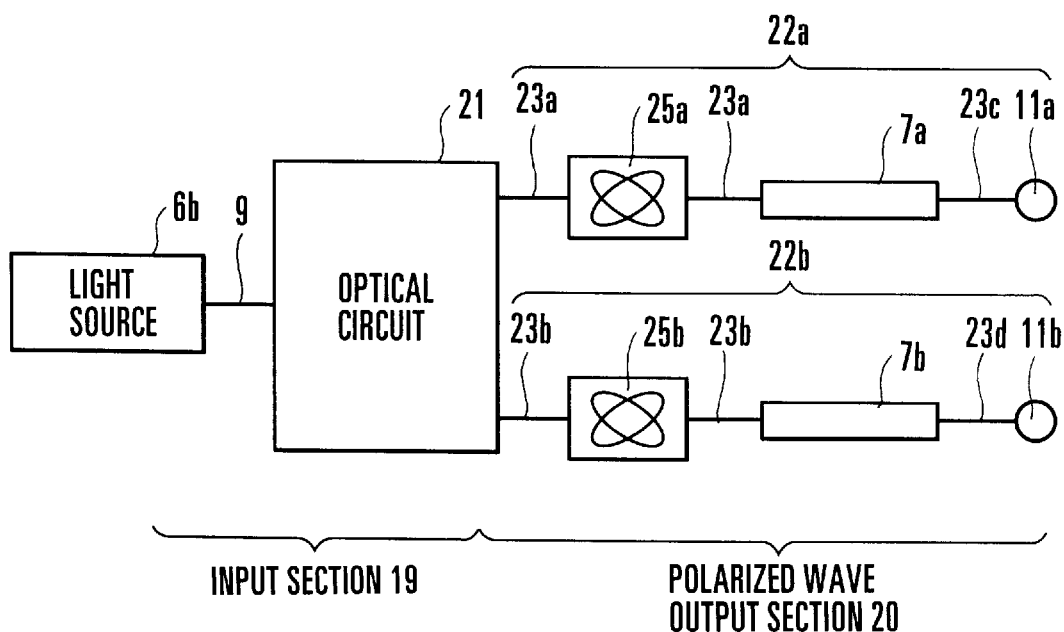
FIG. 10 is a block diagram showing still another embodiment (ninth embodiment) of the present invention.

FIG. 10 shows still another embodiment of an optical circuit of the present invention. This arrangement is obtained by adding state-of-polarization control means 25a and 25b in the arrangement of FIG. 9. The state-of-polarization control means 25a and 25b are inserted midway along DLWGs 23a and 23b, i.e., on the input section 19 side with respect to ELWGs 7a and 7b. The polarization control function is effected by the interaction between the state-of-polarization control means 25a and 25b and the ELWGs 7a and 7b. Light beams having the controlled planes of polarization are output from output terminals 11a and 11b.

A variety of modifications can be proposed for the arrangement of the ninth embodiment. An input section 19 may be comprised of only one DLWG 9 and an optical demultiplexer. Optical waveguides 22a and 22b having no branches in an output section 20 may be constituted by one optical waveguide or three or more optical waveguides. If the optical waveguide 22a or 22b have at least the ELWG 7a or 7b, one or both of the DLWGs 23a and 23c or DLWG 23b and 23d can be omitted. The state-of-polarization control means 25a and 25b are inserted on the input section 19 side of the optical waveguides capable of maintaining the state of polarization. The state-of-polarization control means 25a and 25b may be arranged while kept connected to the ELWGs 7a and 7b. In the ninth embodiment, one of the state-of-polarization control means 25a and 25b may be omitted.

10th Embodiment

A modification of the arrangement of the ninth embodiment is shown in FIG. 11. As shown in FIG. 11, optical waveguides 22a and 22b having no branches are connected to a demultiplexer 24 in an arbitrary optical circuit 21. In the arbitrary optical circuit 21, one DLWG 9i is connected to the optical demultiplexer 24. In this arrangement, one state-of-polarization control means 25 may be arranged midway along the DLWG 9i. In this case, the state-of-polarization control means 25 is inserted on the input section 19 side with respect to ELWGs 7a and 7b. The polarization control function is effected by the interaction between the state-of-polarization control means 25 and the ELWGs 7a and 7b, and light beams having the controlled planes of polarization are output from output terminals 11a and 11b.

11th Embodiment

Figure 22:
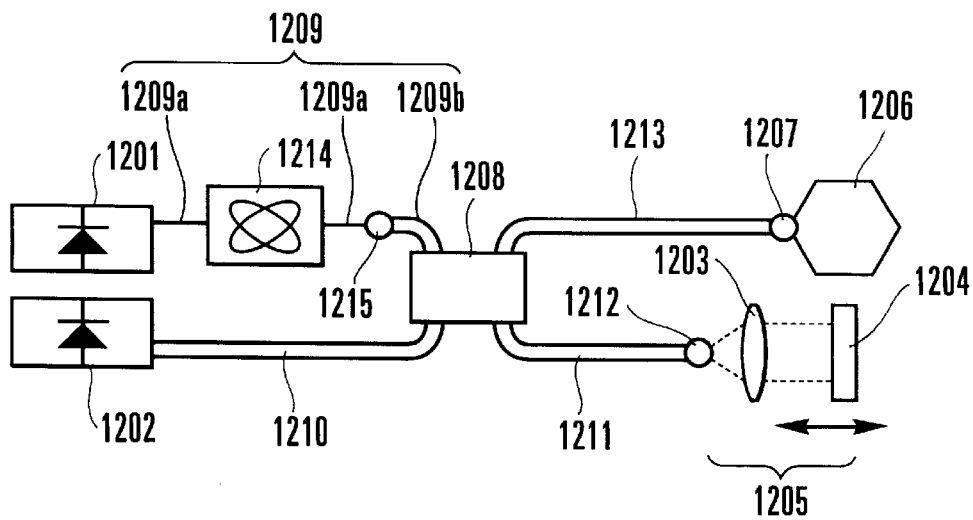
FIG. 22 is a block diagram showing a conventional Michelson optical circuit.
Figure 23:
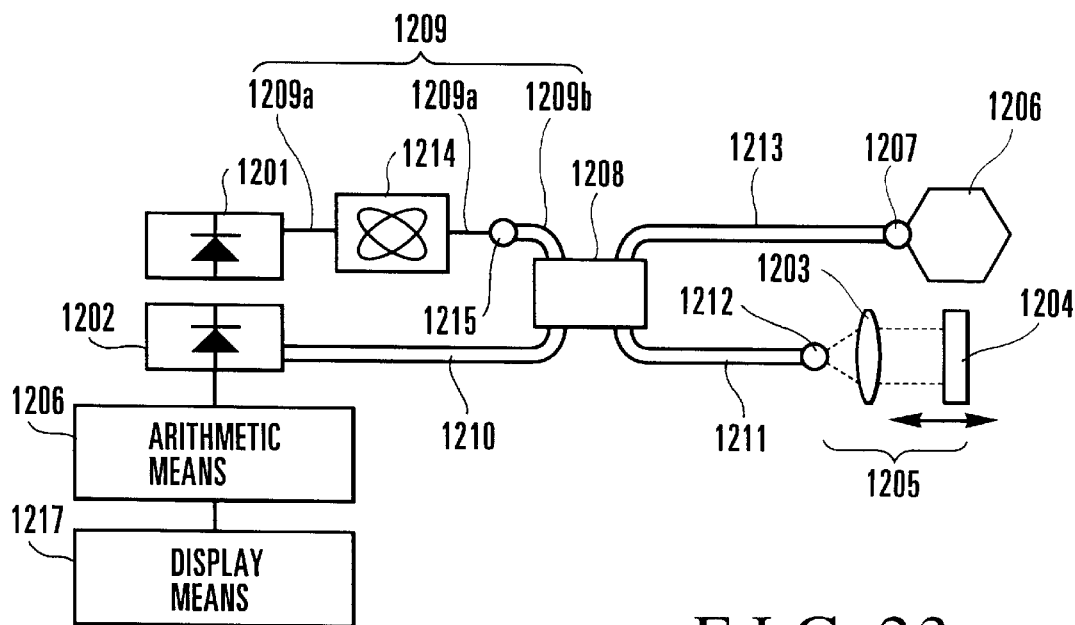
FIG. 23 is a block diagram showing a conventional light beam return loss measuring device.
Figure 24:
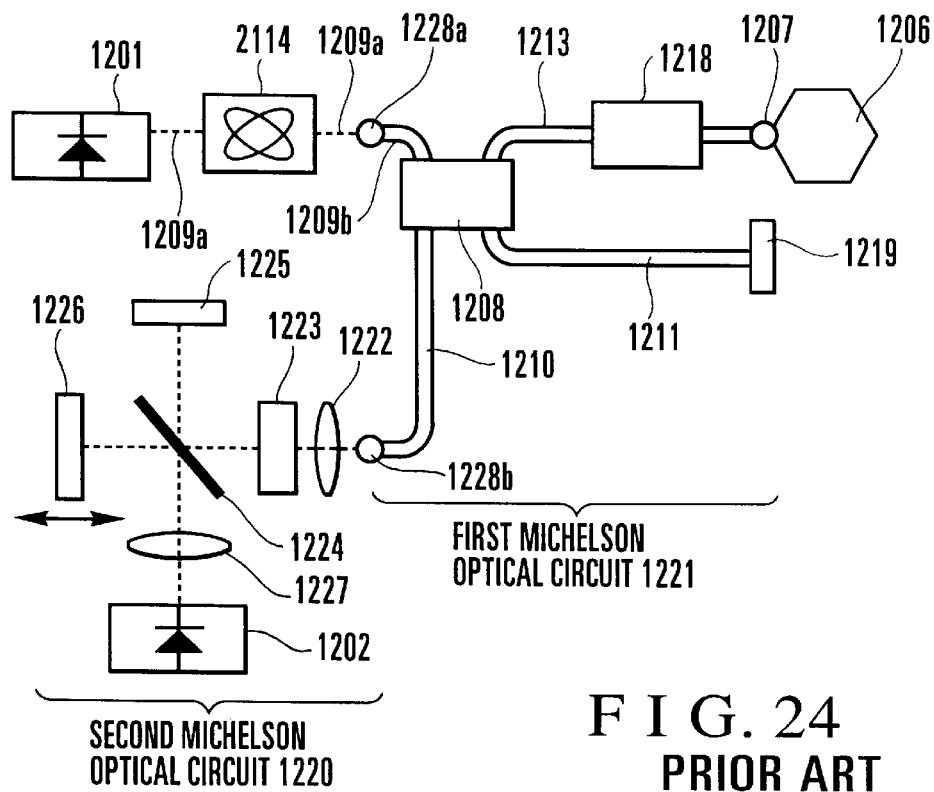
FIG. 24 is a block diagram showing a conventional OLCR arrangement.
Figure 25:
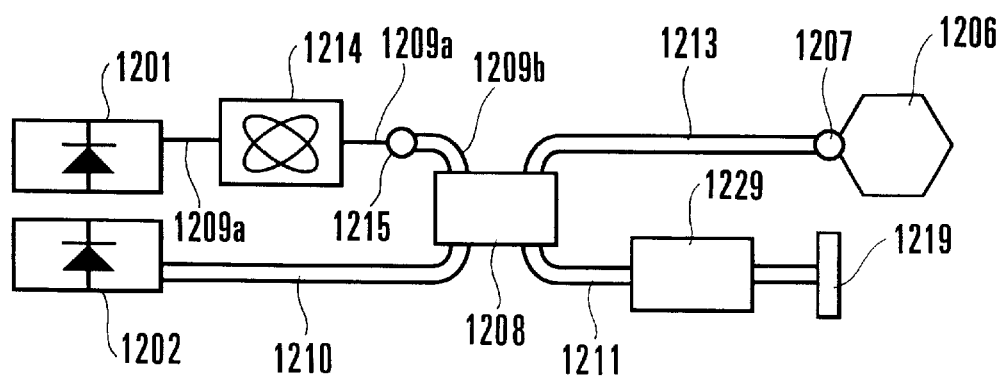
FIG. 25 is a block diagram showing another conventional OLCR arrangement.

FIG. 12 shows an arrangement of a Michelson optical circuit according to the present invention. This arrangement is obtained by using a special light source and omitting the polarization controller 1214 from the conventional Michelson optical circuit in FIG. 22 and reducing the number of polarization maintaining optical fibers.

Referring to FIG. 12, reference numeral 201 denotes a light source having a low degree of polarization; 202, an optical detector; 205, an optical system including a collimator lens 203 and a movable reflecting mirror 204; 207, a terminal connecting a test sample 206; 208, an optical multiplexer/demultiplexer; 209, a first optical waveguide connecting the light source 201 and the optical multiplexer/demultiplexer 208; 210, a second optical waveguide connecting the optical detector 202 and the optical multiplexer/demultiplexer 208; 211, a third optical waveguide connecting the optical system 205 and the optical multiplexer/demultiplexer 208; 212, an output terminal of a light beam output from the third optical waveguide 211 to the optical system 205; and 213, a fourth optical waveguide connecting the optical multiplexer/demultiplexer 208 and the terminal 207 connecting the test sample.

Single-mode optical fibers are used as the first and second optical waveguides 209 and 210. A single-mode optical fiber 9k and a polarization maintaining optical fiber 7d are used for the third optical waveguide 211. A single-mode optical fiber 9j and a polarization maintaining optical fiber 7c are used for the fourth optical waveguide 213. A connecting portion 10d connects the single-mode optical fiber 9j and the polarization maintaining optical fiber 7c. A connecting portion 10e connects the single-mode optical fiber 9k and the polarization maintaining optical fiber 7d. Since the light source 201 is comprised of a light-emitting diode having a low degree of polarization, the function of maintaining the state of polarization by the combination of the light source having a low degree of polarization and the optical waveguide capable of maintaining the state of polarization is effected. No polarization controller is inserted midway along the first optical waveguide 209.

The components of this embodiment are made to correspond to those of the above embodiments. The light source 201 corresponds to the light source 6b. An input section 19A having the first optical waveguide 209, the optical multiplexer/demultiplexer 208, and the single-mode optical fiber 9j constituting the fourth optical waveguide 213 corresponds to the input section 19. A polarized wave output section 20A constituted by the polarization maintaining optical fiber 7c of the fourth optical waveguide 213, the optical detector 202, and the second and third optical waveguides 210 and 211 corresponds to the output section 20.

A light beam emitted by the light source 201 having a low degree of polarization passes through the first optical waveguide 209 and is demultiplexed into two light beams by the optical multiplexer/demultiplexer 208. One light beam passes through the fourth optical waveguide 213 and is guided to the test sample 206. This light beam is reflected by the connection terminal 207 of the test sample 206 or the interior of the test sample 206. The reflected light beam returns to the optical multiplexer/demultiplexer 208 through a reverse path.

The other light beam passes through the third optical waveguide 211, the connecting portion 212, and the collimator lens 203 and is reflected by the reflecting mirror 204. The reflected light beam returns to the optical multiplexer/demultiplexer 208 through a reverse path.

The two reflected light beams returning to the optical multiplexer/demultiplexer 208 cause interference when the optical path lengths of the light beams from demultiplexing to reflection are equal to each other. The interference light beam is demultiplexed by the optical multiplexer/demultiplexer 208 into one light beam. This light beam is guided to the optical detector 202. In this case, the light beams having interference light intensities corresponding to the differences in reflectances of the two light beams are sent to the optical detector 202.

The reflecting mirror 204 is movable. When the distance between the collimator lens 203 and the reflecting mirror 204 is changed, an interference signal between the light beam from the light source and the light beam reflected by a defect in the test sample which is located at the position corresponding to the optical path length equal to that of the light beam from the light source is supplied to the optical detector 202.

In order to cause stable interference in the Michelson interference optical system shown in FIG. 12, the state of polarization must be kept constant at the input position (connection terminal) 207 to the test sample 206 and the input position (output terminal) 212 to the optical system 205. The function of maintaining the state of polarization by the combination of the light source having a low degree of polarization and the optical waveguide capable of maintaining the state of polarization is effected to keep the state of polarization constant at the input positions 207 and 212 without using a polarization controller.

In this embodiment, an edge-emitting diode is used as the light source 201, PANDA fibers are used as the ELWG 7c and 7d, and single-mode optical fibers are used as the DLWGs 9j and 9k respectively. It was confirmed that the state of polarization could be sufficiently maintained at the input position 207 to the test sample 206 and the input position 212 to the optical fiber 205 at a degree of polarization of 30% or less. It was also confirmed that the state of polarization was easily maintained at a lower degree of polarization, and best stability was obtained at a degree of polarization of 10% or less.

In this embodiment, the PANDA fiber is used as an optical waveguide capable of maintaining a state of polarization. However, an optical fiber having increased elliptical deformation and axially asymmetrical side pits in the gradient index to increase structural axial asymmetry, an elliptical jacket fiber having a double cladding structure and an elliptically deformed intermediate cladding to apply stress to the core, and the like can be used in place of the PANDA fiber. In addition, a waveguide in an optical integrated circuit may be used in place of an optical fiber waveguide. The present invention is also applicable to other Michelson optical circuits without departing the spirit and scope of the invention.

12th Embodiment

FIG. 13 shows an arrangement of a light beam return loss measuring device according the present invention. This arrangement is obtained by adding an arithmetic means 216 and a display means 217 to the Michelson optical circuit shown in FIG. 12. The arithmetic means 216 calculates the return loss of the test sample, and the display means 217 displays the return loss of the test sample, which is calculated by the arithmetic means 216.

13th Embodiment

FIG. 14 shows another arrangement of the Michelson optical circuit according to the present invention. Unlike the arrangement of the embodiment shown in FIG. 12, all second, third, and fourth optical waveguides 210, 211, and 213 are made of polarization maintaining optical fibers. The first optical waveguide 209 has a first portion 209a on the light source side and a second portion 209b on the optical multiplexer/demultiplexer side. The first portion 209a is made of a single-mode optical fiber, while the second portion 209b is made of the polarization maintaining optical fiber. The remaining arrangement of FIG. 14 is identical to that of FIG. 12. Reference numeral 215 denotes a connecting portion for connecting the first and second portions 209a and 209b of the first optical waveguide 209. The arrangement of the 13th embodiment is different from that of FIG. 22 in that the polarization controller 1214 is omitted, and the light source has a lower degree of polarization. Since the light source 201 is comprised of a light-emitting diode having a low degree of polarization, the function of maintaining the state of polarization by the combination of the light source having a low degree of polarization and the optical waveguide capable of maintaining the state of polarization is effected. Even if the polarization controller 214 is not inserted midway along the first optical waveguide 209, the state of polarization can be sufficiently maintained at an input position 207 to a test sample 206 and an input position 212 to an optical system 205. Note that the arrangement of this embodiment has no state-of-polarization control means.

14th Embodiment

Figure 15:
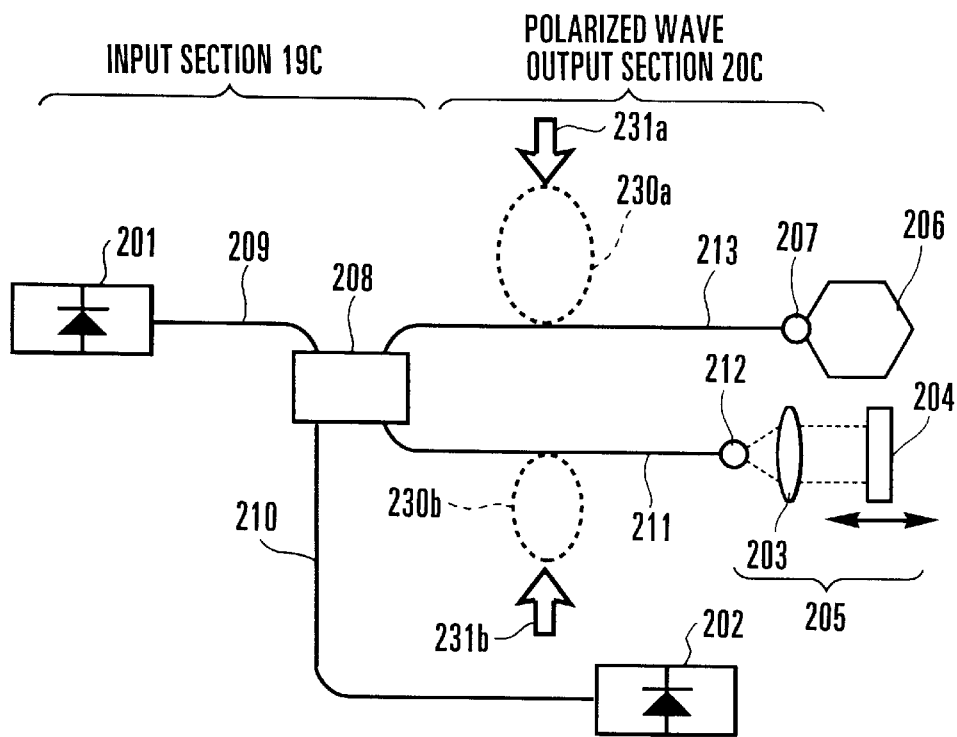
FIG. 15 is a block diagram showing still another embodiment (14th embodiment) of the present invention.
Figure 16:
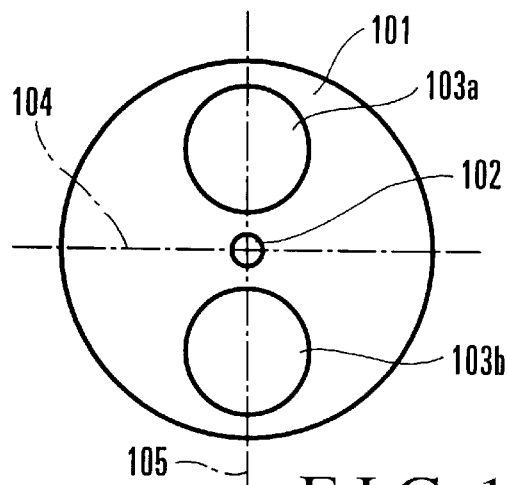
FIG. 16 is a sectional view showing a conventional PANDA fiber.
Figure 17:
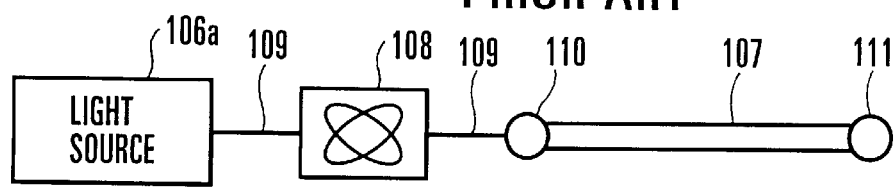
FIG. 17 is a block diagram showing a conventional optical circuit.
Figure 18:
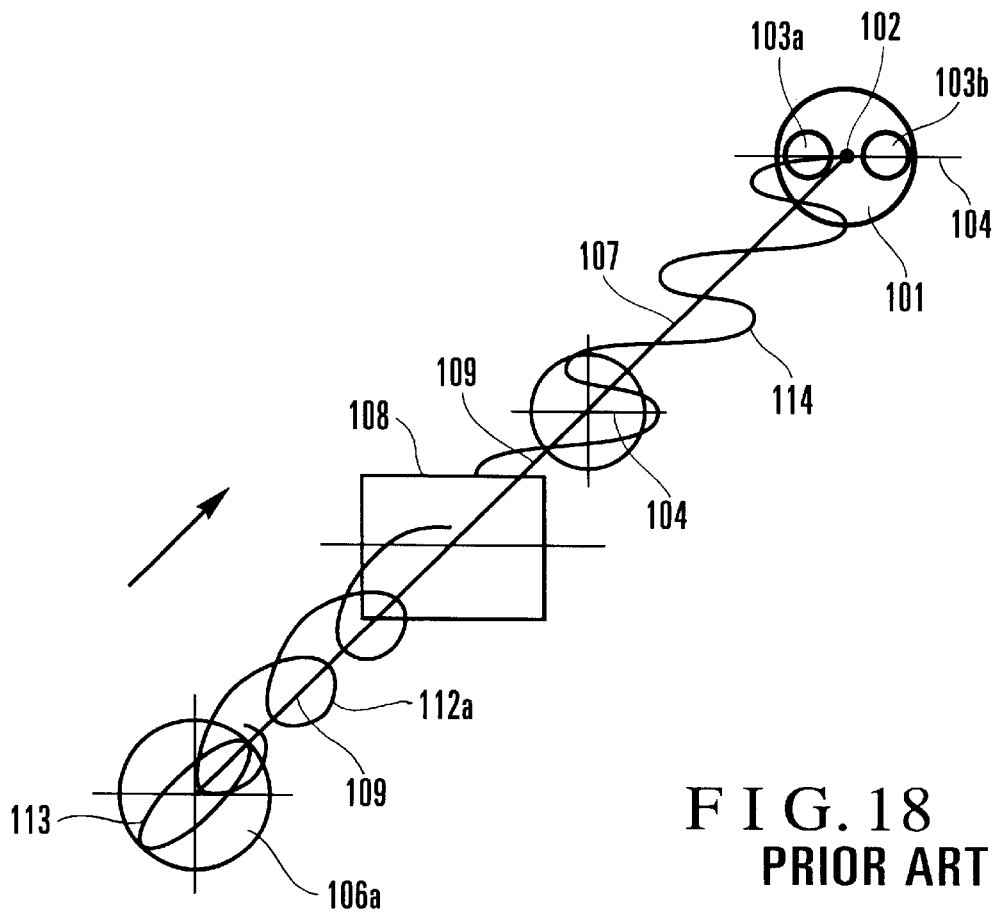
FIG. 18 is a view for explaining the state of a propagation light beam in the optical circuit system shown in FIG. 17.
Figure 19:
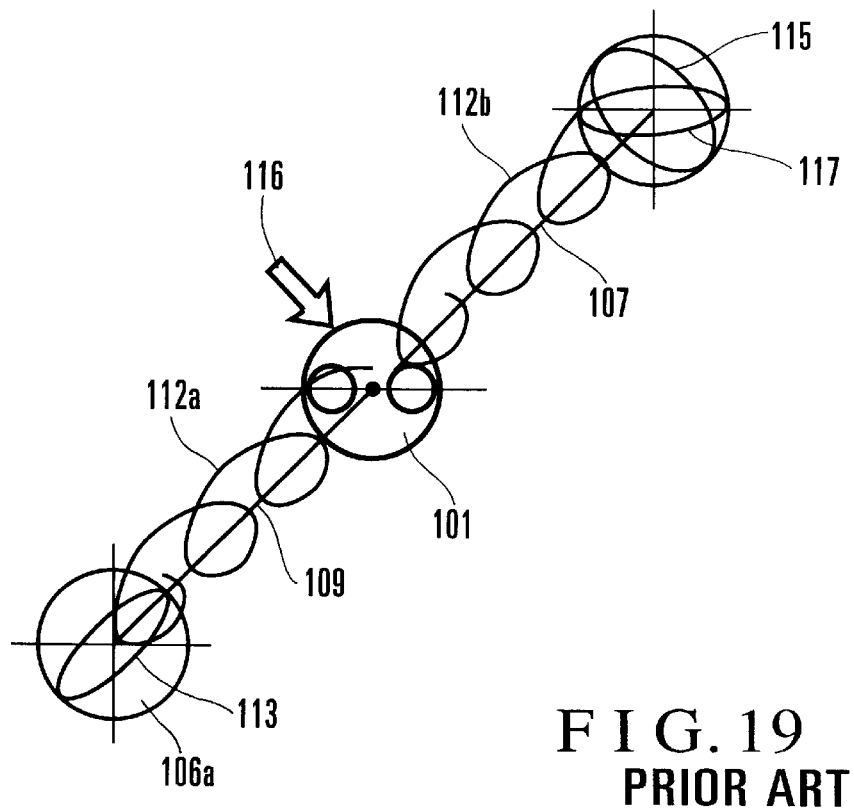
FIG. 19 is a view for explaining the state of a propagation light beam when a light source having a high degree of polarization is used.
Figure 20:
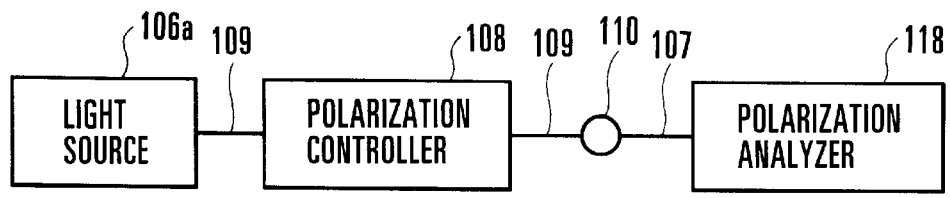
FIG. 20 is a block diagram showing another conventional optical circuit.
Figure 21:
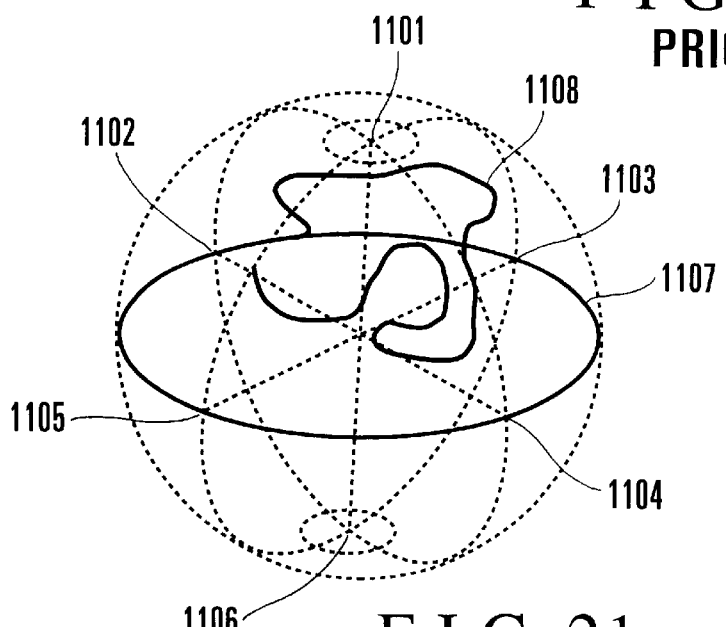
FIG. 21 is a view for explaining a state of polarization on the Poincaré sphere in the optical circuit of FIG. 20.

FIG. 15 shows still another arrangement of the Michelson optical circuit according to the present invention. Unlike the arrangement shown in FIG. 12, third and fourth optical waveguides 211 and 213 form loops 230a and 230b, which are susceptible to disturbance. The optical waveguides capable of maintaining a state of polarization are used in only the loops 230a and 230b. The remaining arrangement of this embodiment is identical to that of FIG. 12. The disturbance occurs due to dynamic stress or stress based on temperature and humidity. In this arrangement, even if PANDA fibers serving as the optical waveguides capable of maintaining the state of polarization are used in only the loops 230a and 230b susceptible to disturbances 231a and 231b, the state of polarization can be sufficiently maintained at an input position 207 to a test sample 206 and an input position 212 to an optical system 205.

As has been described above, according to the present invention, there can be provided an optical circuit having characteristics for sufficiently maintaining the state of polarization at a predetermined position in the optical circuit with a simple arrangement from which a state-of-polarization control means such as a polarization controller is omitted. There can also be provided an inexpensive, compact, easy-to-handle Michelson optical circuit and light beam return loss measuring device.

What is claimed is:

1. A method of maintaining an incident optical signal having a low degree of polarization in a specific state of polarization at an output terminal of an optical waveguide, comprising the steps of:
   inputting the optical signal having a low degree of polarization to an input section having as an input terminal an optical waveguide incapable of maintaining a state of polarization; and
   outputting an optical signal having the specific state of polarization to an output terminal of a polarized wave output section through said polarized wave output section having, in at least part thereof, an optical waveguide capable of maintaining a state of polarization; and
   controlling state-of-polarization control means at an input of said optical waveguide capable of maintaining a state of polarization to change another specific state of polarization from one specific state of polarization.

2. A method according to claim 1, wherein said state-of-polarization control means controls a state of polarization on a longitude of a Poincaré sphere.

3. An optical circuit comprising:
   a light source having a low degree of polarization;
   an input section connected to said light source;
   a polarized wave output section connected to said input section,
   said input section having an optical waveguide incapable of maintaining a state of polarization,
   said polarized wave output section having at least one optical waveguide with no branches and
   said optical waveguide with no branches having, in at least part thereof, an optical waveguide capable of maintaining a state of polarization; and
   state-of-polarization control means arranged at an input of said optical waveguide capable of maintaining a state of polarization.

4. An optical circuit comprising:
   a light source having a low degree of polarization;
   an input section connected to said light source; and
   a polarized wave output section connected to said input section,
   said input section having an optical waveguide incapable of maintaining a state of polarization,
   said polarized wave output section having at least one optical waveguide with no branches and
   said optical waveguide with no branches having, in at least part thereof, an optical waveguide capable of maintaining a state of polarization
   wherein said input section further comprises an optical multiplexer/demultiplexer, and a first optical waveguide connecting said light source and said optical multiplexer/demultiplexer,
   said polarized wave output section comprises a first output terminal coupled to a test sample, a second output terminal coupled to an optical system, an optical detector, and a second optical waveguide connecting said optical detector and said optical multiplexer/demultiplexer,
   said polarized wave output section further comprises a third optical waveguide connecting said optical system and said optical multiplexer/demultiplexer, and a fourth optical waveguide connecting said optical multiplexer/demultiplexer and a test sample,
   said light source comprises a light source having a low degree of polarization, said first and second optical waveguides comprise optical waveguides incapable of maintaining a state of polarization,
   said third optical waveguide comprises an optical waveguide incapable of maintaining a state of polarization and an optical waveguide capable of maintaining a state of polarization, and
   said fourth optical waveguide comprises an optical waveguide incapable of maintaining a state of polarization and an optical waveguide capable of maintaining a state of polarization, thereby constituting a Michelson optical circuit.

5. A circuit according to claim 4, further comprising arithmetic means for calculating a return loss of the test sample on the basis of an output from said optical detector, and means for displaying the return loss calculated by said arithmetic means.

6. A circuit according to claim 4, wherein said optical waveguides capable of maintaining a state of polarization are formed at portions of said third and fourth optical waveguides, which are susceptible to disturbances.

7. A circuit according to claim 4, wherein said light source comprises a light emitting diode.

8. An optical circuit comprising:

a light source having a low degree of polarization;

an input section connected to said light source; and a polarized wave output section connected to said input section, said input section having an optical waveguide incapable of maintaining a state of polarization, said polarized wave output section having at least one optical waveguide with no branches and said optical waveguide with no branches having, in at least part thereof, an optical waveguide capable of maintaining a state of polarization wherein said polarized wave output section comprises a connection terminal to an optical system, a terminal connecting a test sample, a multiplexer/demultiplexer, a third optical waveguide connecting said optical system and said optical multiplexer/demultiplexer, a fourth optical waveguide connecting said terminal connecting a test sample and said optical multiplexer/demultiplexer, an optical detector, and a second optical waveguide connecting second optical detector and said optical multiplexer/demultiplexer, said input section comprises a first optical waveguide connecting said light source and said optical multiplexer/demultiplexer, said light source comprises a light source having a low degree of polarization, and said first optical waveguide comprises a first portion incapable of maintaining a state of polarization, said first portion is connected to said optical multiplexer/demultiplexer by a second portion capable of maintaining a state of polarization, and said second, third, and fourth optical waveguides comprise optical waveguides capable of maintaining a state of polarization to constitute a Michelson optical circuit.

9. A method of maintaining an incident optical signal having a low degree of polarization in a specific state of polarization at an output terminal of an optical waveguide, comprising:

inputting the optical signal having a low degree of polarization to an input section having at least one input terminal optical waveguide, at least a portion of which is incapable of maintaining a state of polarization, said waveguide coupled to an optical multiplexer/demultiplexer; and outputting an optical signal having the specific state of polarization to an output terminal of a polarized wave output section through said polarized wave output section having, in at least part thereof, an optical output waveguide capable of maintaining a state of polarization, said output waveguide coupled between said optical multiplexer/demultiplexer and said output terminal.

10. An optical circuit comprising:

a light source having a low degree of polarization;

an input section connected to said light source; and a polarized wave output section connected to said input section, said input section having an optical multiplexer/demultiplexer and at least one input waveguide connecting said light source and said optical multiplexer/demultiplexer, each of said input waveguides having, in at least a part thereof, an optical waveguide incapable of maintaining a state of polarization, said polarized wave output section having at least one optical output waveguide with no branches coupled between said optical multiplexer/demultiplexer and an output, and each of said optical output waveguides with no branches having, in at least part thereof, an optical waveguide capable of maintaining a state of polarization.

* * * * *

UNITED STATES PATENT AND TRADEMARK OFFICE
CERTIFICATE OF CORRECTION

PATENT NO. : 6,393,168 B1
DATED : May 21, 2002
INVENTOR(S) : Atoji et al.

It is certified that error appears in the above-identified patent and that said Letters Patent is hereby corrected as shown below:

<u>Title page,</u>
Item [56], References Cited, FOREIGN PATENT DOCUMENTS, "7-140358", please delete "6/1998" and insert -- 6/1995 --.

Signed and Sealed this

Twenty-seventh Day of April, 2004

JON W. DUDAS
*Acting Director of the United States Patent and Trademark Office*